United States Patent
Lai

(10) Patent No.: US 7,192,149 B2
(45) Date of Patent: Mar. 20, 2007

(54) DIRECT TYPE BACKLIGHT MODULE

(75) Inventor: Kuang-Chou Lai, Chung Li (TW)

(73) Assignee: AU Optronics Corp., Hsinchu (TW)

( * ) Notice: Subject to any disclaimer, the term of this patent is extended or adjusted under 35 U.S.C. 154(b) by 6 days.

(21) Appl. No.: 11/195,709

(22) Filed: Aug. 3, 2005

(65) Prior Publication Data

US 2006/0072299 A1   Apr. 6, 2006

(30) Foreign Application Priority Data

Oct. 1, 2004   (TW) .............................. 93129842 A

(51) Int. Cl.
*G01D 11/28* (2006.01)

(52) U.S. Cl. .......................... 362/29; 362/225; 362/260
(58) Field of Classification Search ................. 362/29, 362/30, 97, 223, 225, 260, 561; 349/58, 349/60, 64, 67, 70

See application file for complete search history.

(56) References Cited

U.S. PATENT DOCUMENTS

| | | | | | |
|---|---|---|---|---|---|
| 4,338,653 | A | * | 7/1982 | Marrero | 362/260 |
| 6,979,102 | B2 | * | 12/2005 | You | 362/29 |
| 7,070,313 | B2 | * | 7/2006 | Kim et al. | 362/561 |

* cited by examiner

*Primary Examiner*—Y. My Quach-Lee
(74) *Attorney, Agent, or Firm*—Troxell Law Office PLLC

(57) ABSTRACT

A direct type backlight module comprises a bezel, a reflection sheet, a light source, a diffusion plate, and a supporting unit. The light source is positioned between the bezel and the diffusion plate, and the reflection sheet is positioned on the upper surface of the bezel. The supporting element is fixed within the bezel to support the diffusion plate upwardly. The bezel further comprises a fixing hole and a button hole for fixing the supporting element. The supporting unit comprises a planar plate, a cone, a jammed plug, and a fixing button. The cone is positioned upon the planar plate to erect between the planar plate and diffusion plate. The top of the cone contacts with the diffusion plate. The jammed plug connects to the bottom surface of the planar plate by passing through the bezel via the fixing hole. The fixing button connects to the bottom surface of the planar plate, but distances the jammed plug by a fix distance, and inserts through the button hole of the bezel.

5 Claims, 6 Drawing Sheets

DIRECT TYPE BACKLIGHT MODULE

BACKGROUND OF THE INVENTION (1) Field of the Invention

The invention relates to a direct type backlight module of a Liquid Crystal Display (LCD), and more particularly to a supporting unit of the direct type backlight module.

(2) Description of the Prior Art

Liquid Crystal Display (LCD), is well known to be applied to portable electronic products such as notebook PCs, cell phones, digital cameras, digital video machines and Personal Digital Assistants (PDA). Recently, maturity in techniques of making larger sized LCD has affected the market of display products quite a lot. For example, the desktop-typed LCDs are replacing the traditional CRT monitors. The LCD TV takes advantage of its thinness and lightness to compete with the traditional TV product. Within an LCD, the liquid crystal panel (usually "panel" for short) is an elementary element of the whole device. For the liquid crystal panel does not generate light itself, a back light source is needed for providing light to the panel. Larger sized LCD, about 20" and larger, usually adopts direct type backlight module as its back light source.

Please refer to FIG. 1. It illustrates a cross section view of a panel and a direct type backlight module. As described above, the panel 10 does not generate light itself. So, a direct type backlight module 2 is disposed under the panel 10 so as to allow a user to see images presented by the panel 10.

The direct type backlight module 2 comprises a back bezel 22, a plurality of lamps 24 and a diffusion plate 26. The back bezel 22 comprises a substrate 221 and sidewalls 223 extending upward from margin areas of the substrate 221. The diffusion plate 26 is disposed on top of the sidewalls 223 and maintains a predetermined distance from the substrate 221. The plurality of lamps 24 is disposed between the diffusion plate 26 and the substrate 221. Each lamp 24 is arranged in a predetermined distance from each other. A light-reflecting material or a reflection sheet 28 is usually applied or disposed on the substrate 221 so as to enhance light-utilizing efficiency of the direct type backlight module 2.

However, some problems are accompanied with making larger sized LCDs. When the panel 10 and the direct type backlight module 2 become larger, a larger diffusion plate 26 is definitely needed. For the diffusion plate 26 is disposed on top of the sidewalls 223 and thus is only supported by the margin areas of the diffusion plate 26, the broader and heavier diffusion plate 26 would make itself bending to a convex shape. Such a bending of the diffusion plate 26 would change its original optical design and degrade the light uniformity. Besides, assembly quality between sidewalls 223 and diffusion plate 26 may also be reduced because of the bending of the diffusion plate 26.

For the situations described above, a plurality of supporting elements is then adopted between the diffusion plate 26 and the substrate 221 of the back bezel 22 to enhance the assembly quality of the direct type backlight module 2. Typical prior arts about those supporting elements are described below.

Please refer to FIG. 2. FIG. 2 illustrates a cross section view of a typical supporting element. Generally, the supporting element 3 is used as a cone shape, so also called as a "supporting cone". The cone-shaped supporting element 3 has a top end with a smaller cross-section diameter L1 and a bottom end with a larger cross-section diameter L2. The rounded top end of the element 3 would point-contact with the diffusion plate 26 to avoid substantially light to enter the diffusion plate 26 through the contact area; i.e., to prevent an obvious "dark point" occurred in the direct type backlight module 2. However, to have the supporting element 3 screw-fastened to the substrate 221, the bottom end with a larger cross-section diameter L2 cannot be waived.

However, the prior art described above with FIG. 2 involves human labor in assembling the supporting element 3 by the screw 32. Thus, cost and production are limited due to its less-automation.

Please refer to FIG. 3. FIG. 3 illustrates a cross section view of another prior supporting cone. Similar to FIG. 2, the supporting cone 404 has a top end with a smaller cross-section diameter L1 and a bottom end with a larger cross-section diameter L3. In this case, the supporting cone 4 further comprises a column 402, a spring 404 and an anchor 406. The column 402 extends downward from the bottom end of supporting cone 4. The anchor 406 connects to the bottom of the column 402. The spring 404 surrounds the column 402. As shown in FIG. 3, the spring 404 and the anchor 406 are separately located at the different sides of the substrate 221 so as to clip the substrate 221 in between. A retainer ring 402 could also be adopted at the anchor 406 side to enhance the clipping performance. Thanks to a suitable configuration design as shown, the anchor 406 can be forced to deformed to pass through the hole of the substrate 221 during the mounting.

Although the prior supporting cone 4 shown in FIG. 3 is much easier to be assembled. However, the spring 404 limits its supporting ability. When an external force larger than the elastic force of the spring 404 is applied to the diffusion plate 26, the supporting cone 4 may slide within a predetermined distance (symbol "d" in FIG. 3). Yet, once the spring 404 is fatigue, the supporting tolerance may be lost.

Hence, how to improve the assembly process of the supporting cone easier and how to enhance the supporting ability in the direct type backlight module are important in achieving quality assembly of the module.

SUMMARY OF THE INVENTION

It is an object of the present invention to provide a supporting unit of a direct type backlight module.

It is another object of the present invention to provide a supporting unit of a direct type backlight module to simplify assembled process.

A direct type backlight module in accordance with the present invention comprises a bezel, a reflection sheet, a light source, a diffusion plate, and a supporting unit. The light source is positioned between the bezel and the diffusion plate, and the reflection sheet is positioned on the upper surface of the bezel. The supporting element is fixed within the bezel to support the diffusion plate upwardly. The bezel further comprises a fixing hole and button hole, which both are used for fixing the supporting element. The supporting unit comprises a planar plate, a cone, a jammed plug, and a fixing button. The cone is positioned upon the planar plate for erecting the diffusion plate by having the top of the cone contact with the diffusion plate. The jammed plug connects to the bottom surface of the planar plate, crosses the bezel and inserts into the fixing hole. The fixing button connects to the bottom surface of the planar plate which distances the jammed plug by a fix distance and inserts into the button hole for crossing the bezel.

BRIEF DESCRIPTION OF THE DRAWINGS

The present invention will now be specified with reference to its preferred embodiment illustrated in the drawings, in which.

DESCRIPTION OF THE PREFERRED EMBODIMENT

Figure 1:
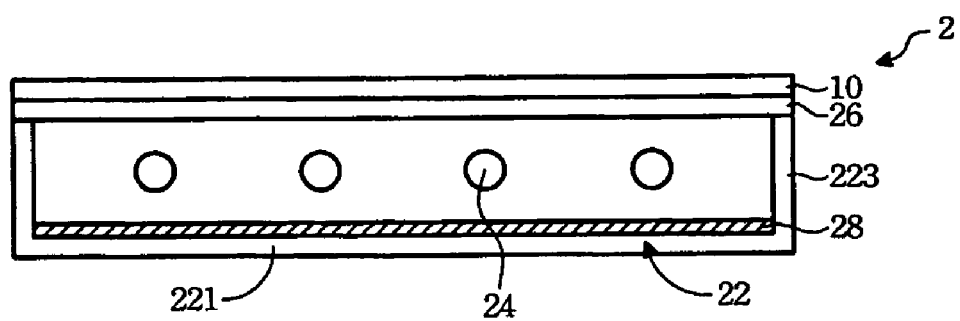
FIG. 1 illustrates a cross section view of a panel and a direct type backlight module.
Figure 2:
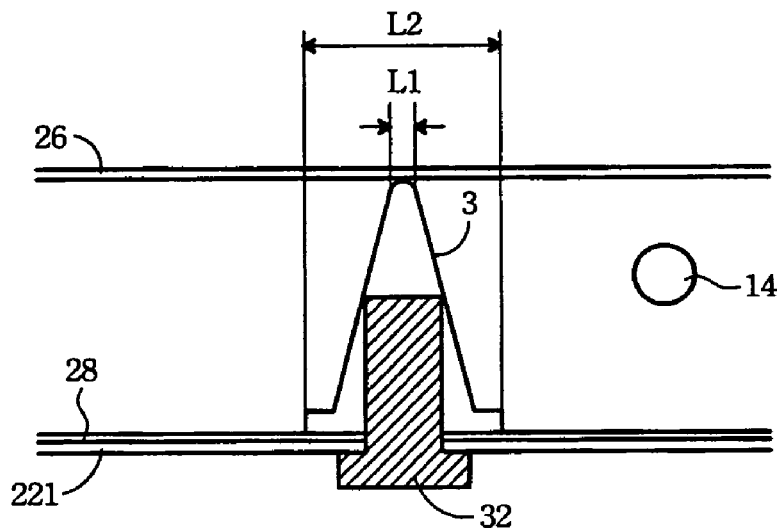
FIG. 2 illustrates a cross section view of a typical supporting element.
Figure 3:
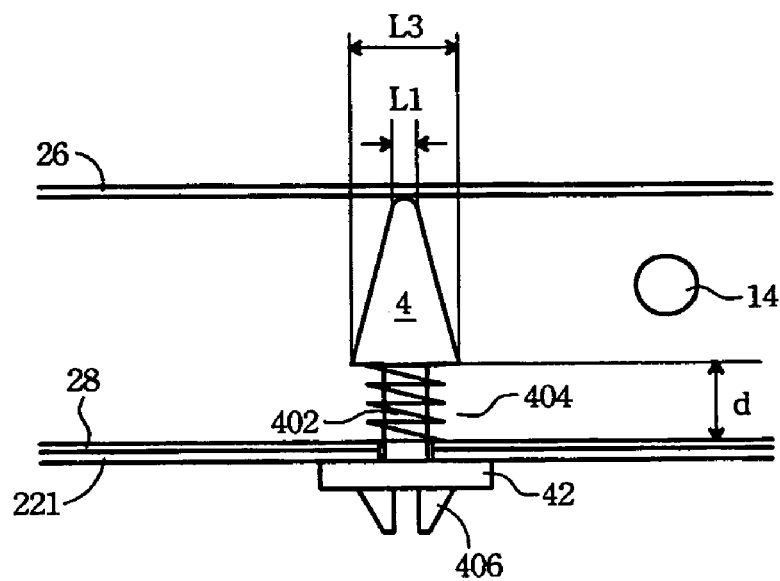
FIG. 3 illustrates a cross section view of another prior supporting cone.
Figure 4A:
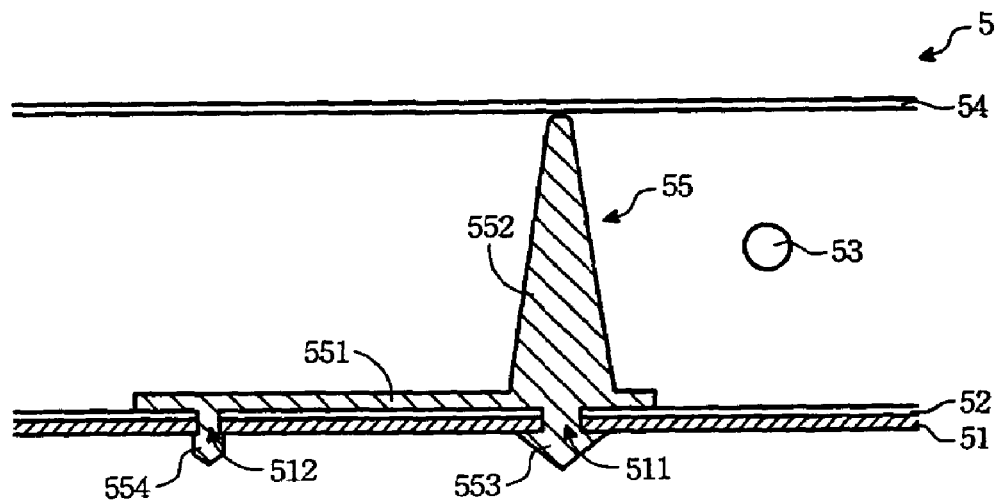
FIG. 4A~4B are the cross section figures of the direct type backlight module in accordance with the present invention.

Please refer to FIG. 4A of the present invention, which is the cross section Figure of the direct type backlight module. The direct type backlight module 5 in FIG. 4A comprises a bezel 51, a reflection sheet 52, a light source 53, a diffusion plate 54, and a supporting unit 55. The light source 53 is positioned between the bezel 51 and the diffusion plate 54, and the reflection sheet 52 is positioned on the upper surface of the bezel 51. The supporting element 55 mounted on the bezel 51 is used to support the diffusion plate 54 upwardly. The bezel further comprises a fixing hole 511 and a button hole 512, which both are used for fixing the supporting element 55.

Figure 4B:
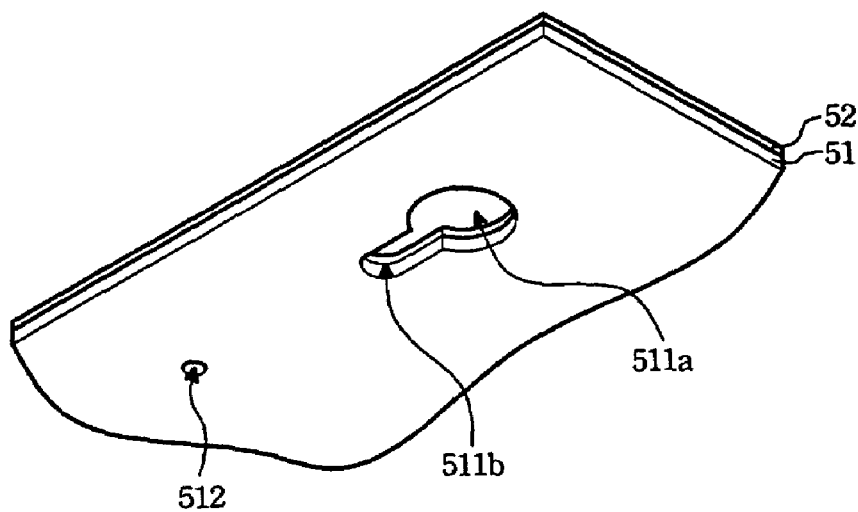

As shown in FIG. 4A, the supporting unit 55 comprises a planar plate 551, a cone 552, a jammed plug 553, and a fixing button 554. The planar plate 551 is positioned parallel to the bezel 51. The cone 552 is positioned upon the planar plate 551 and erects between the planar plate 51 and diffusion plate 54. The top of the cone 552 contacts with the diffusion plate 54. The jammed plug 553 connects to the bottom surface of the planar plate 551, and crosses the bezel 51 by inserting into the fixing hole 511. The fixing button 554 connects to the bottom surface of the planar plate 551, in which the fixing button 554 spaces from the jammed plug 553 by a fix distance and inserts into the button hole 512 by crossing the bezel 51. The fixing hole 511 further comprises a pass area 511a and a jam area 511b, in which the diameter of the jam area 511b is smaller that diameter of the pass area 511a (as shown in FIG. 4B).

Figure 5A:
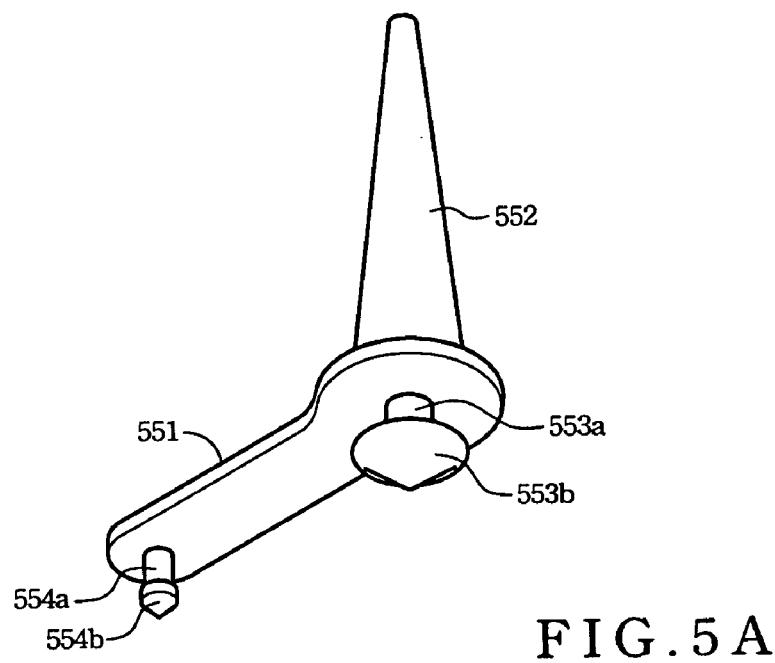
FIG. 5A is the detail structure of the supporting unit 55 of FIG. 4A.

Please refer to the FIG. 5A for detail structure of the supporting unit 55. As shown, the jammed plug 553 further comprises a plug body 553a and a jammed plate 553b. The top of the plug body 553a is designed to point-touch the bottom surface of the planar plate 551 and the jammed plate 553b extends under the plug body 553a for passing through the bezel 51. The diameter of the jammed plate 553b is larger than the diameter of the plug body 553a, and thus the jammed plug 553 can pass the fixing hole 511 to jam and be fixed to the bezel.

The fixing button 554 further comprises a pillar 554a and a button body 554b, in which the top of the pillar 554a is used to touch the bottom surface of the planar plate 551, and the button body 554b is shown to extend under the pillar 554a. The diameter of the button body 554b is larger than the diameter of the button hole 512, thus the button body 554b can buckle to the button hole 512.

During the assembling process, the jammed plug 553 passes the bezel 51 firstly via the pass area 511a of the fixing hole 51, and then is shifted to the jam area 511b so as to anchor the supporting unit 55 at the bezel 51. The diameter of the jam area 511b is substantially the same as the outer diameter of the plug body 553a but smaller than the outer diameter of the jammed plate 553b, such that the supporting unit 55 can be jammed within the bezel 51 by the jammed plate 553b without any movement in the vertical direction.

Figure 5B:
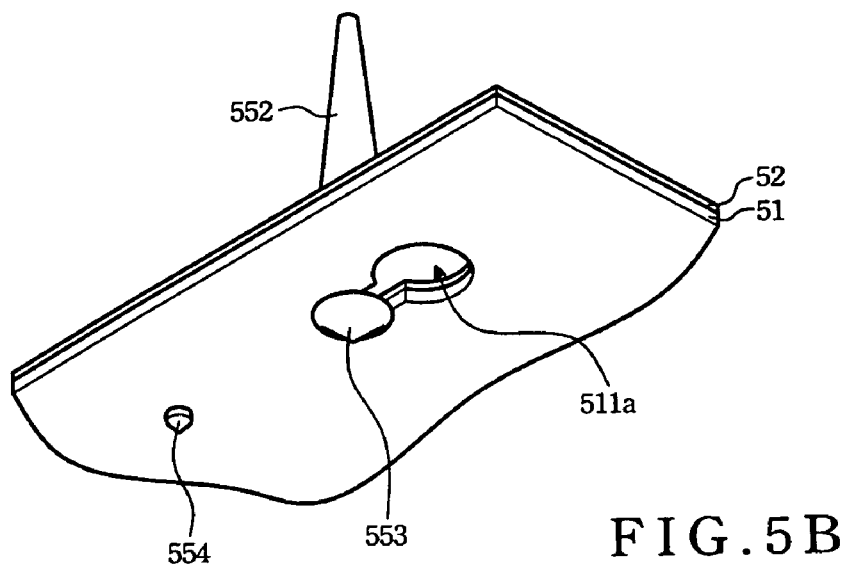
FIG. 5B is the bottom view after the supporting unit 55 assembled to the bezel 51.

After the jammed plug jammed by the fixing hole 511, the fixing button 554 is just right on the site of the button hole 512. Simply a press process can press the fixing button 554 into the button hole 512 to completely fix the supporting unit 55 at the bezel 51. It is noted that the bigger diameter of the button body 554b makes the supporting unit 55 can't move in the horizontal direction. Please refer to FIG. 5B, which is the bottom view after the supporting unit 55 is assembled to the bezel 51. Upon such an arrangement, the supporting cone 552 be fixed tightly in both vertical and horizontal directions. The supporting unit 551 fixed on the bezel via these jam and buckle process does definitely help do shorten the assembling time of the supporting unit 55.

The planar plate 551 of the supporting unit 55 is preferred to be coated with white painting or reflecting material because these materials can reflect light just by the same way as the reflection sheet of prior art does The supporting unit 55 of this invention does not only provide the supporting ability towards the diffusion, but also enhances the adhesive degree of the reflection sheet and the bezel. In prior arts, dual-side adhesive pads are usually used for adhering the bezel and the reflection sheet. However, the dual-side adhesive pad may become less adhesive after a long time usage. By using the supporting unit of the present invention, the process of adhering the reflection sheet and the bezel can be simplified and also the required amount of dual-side adhesive pads can be reduced to a minimum.

In order to have the supporting unit fixed more tightly in both vertical and horizontal directions within the bezel, the thickness of both the plug body 553a and the pillar 554a is preferably the same as the thickness of the bezel 51 (as shown in FIG. 4).

Figure 6A:
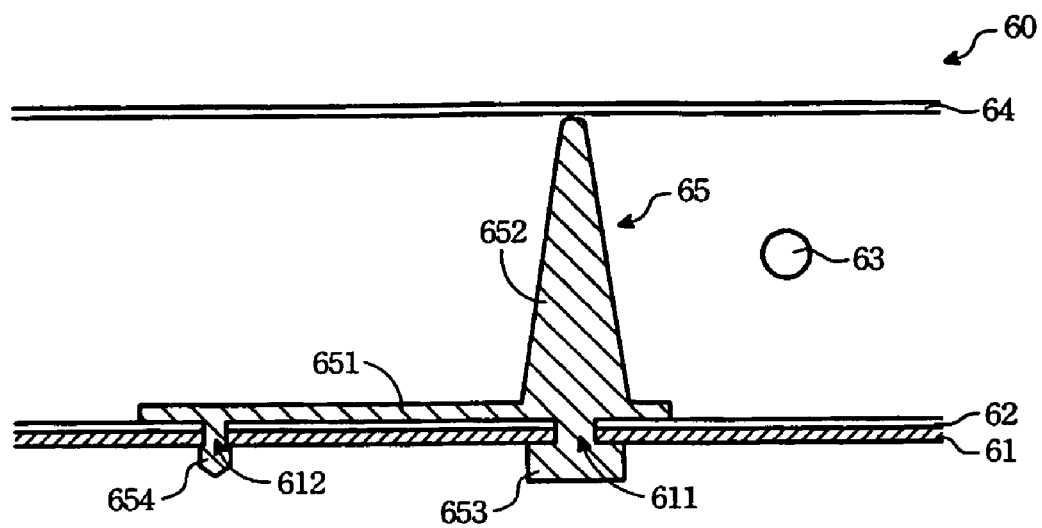
FIG. 6A is a cross view of the direct type backlight module of another embodiment.
Figure 6B:
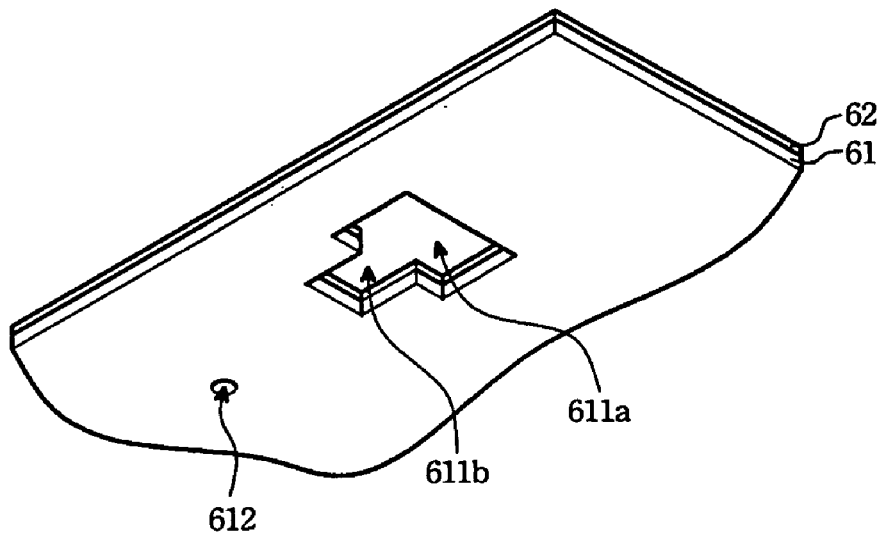
FIG. 6B is the bottom view of the bezel 61.

The supporting element in the invention can use another form to achieve the goal of jamming tightly. FIG. 6A shows a cross view of another embodiment of the direct type backlight module in accordance with the present invention. The direct type backlight module 6 comprises a bezel 61, a reflection sheet 62, a light source 63, a diffusion plate 64, and a supporting unit 65. The geometrical relation among parts and the corresponding functions in the present embodiment are mostly similar to those of the first embodiment described previously. Yet, the only differences in between are the configuration of the supporting unit 65, the shape of the fixing hole 611, and the shape of the bottom hole 612 (shown in the FIG. 6B).

Figure 7A:
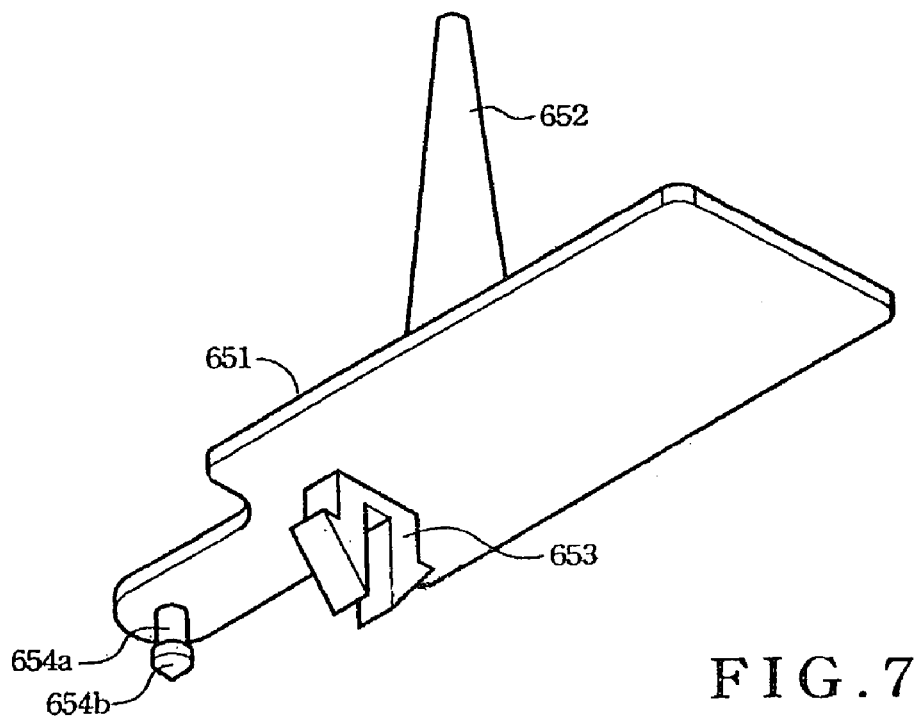
FIG. 7A is the detail structure of the supporting unit 65.
Figure 7B:
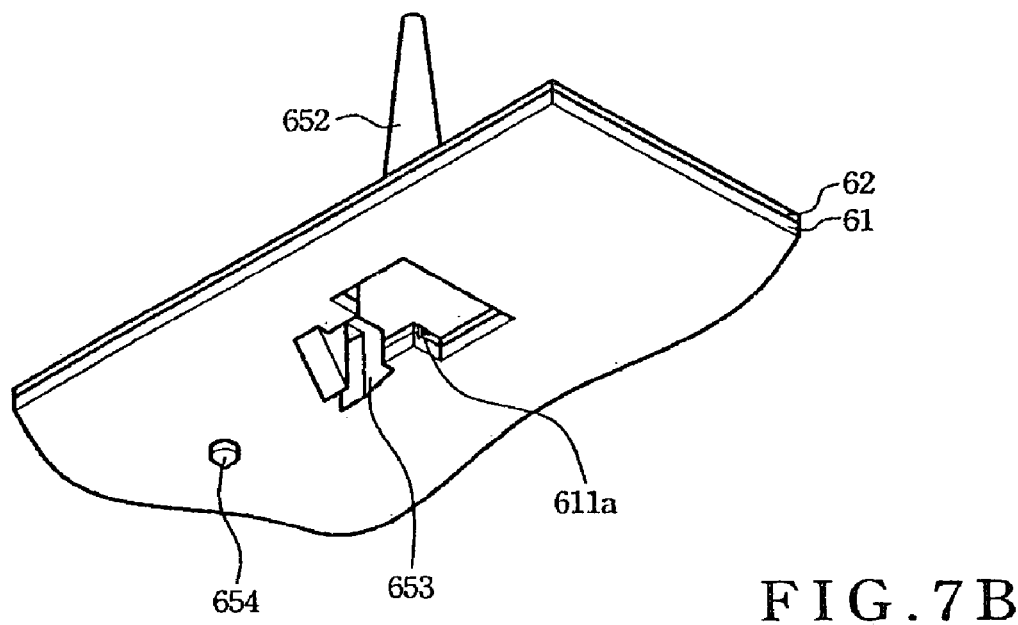
FIG. 7B is the bottom view after the supporting unit 65 assembled to the bezel 61.

Please refer to the FIG. 7A for detail structure of the supporting unit 65. Similar to the mentioned embodiment, the supporting unit comprises a jammed plug 653 and a fixing button 654. The fixing button 654 comprises a pillar 654a and a button body 654b, and the shaping for the pillar 654a and the button body 654b is preferably designed to match the shapes of the pass area 611*a* and the jam area 611*b* in the bezel 61. Upon such an arrangement, the supporting unit 65 can also be jammed tightly with the bezel 61 (sown as FIG. 7B).

To sum up, the present invention provides a supporting cone of a direct type backlight module, which is quite easy to be assembled. In assembling, no screw or other tools is needed. Thus, cost from the labor and the process time for assembling the direct type backlight module can be substantially reduced. Besides, the present supporting cone is fixed quite rigidly with the back bezel in both the vertical and the horizontal directions. Also, the previous concern upon the fatigue of the materials can no longer exist in the present invention. So a direct type backlight module with a solid and steady assemble quality can be obtained. Further more, the optical design within the present invention provides a satisfied solution to avoid the "shadow point", which is definitely superior to the prior arts. Therefore, quality in even brightness for the direct type backlight module can be easily achieved by providing the present invention.

While the present invention has been particularly shown and described with reference to a preferred embodiment, it will be understood by those skilled in the art that various changes in form and detail may be without departing from the spirit and scope of the present invention.

I claim:

1. A direct type backlight module, comprising:
   a light source;
   a bezel disposed under the light source having a fixing hole and a button hole formed apart from the fixing hole;
   a diffusion plate disposed over the light source; and
   a supporting unit disposed between the bezel and the diffusion plate and buckled to bezel by partly passing through the fixing hole and the button hole, the supporting unit comprising:
   a planar plate dispose on the bezel;
   a cone, connected to an upper surface of the planar plate, being in contact with the diffusion plate;
   a jammed plug connected to a bottom surface of the planar plate and passing through the fixing hole of the bezel; and
   a fixing button connected to the bottom surface of the planar plate apart from the jammed plug and passing through the button hole of the bezel.

2. The backlight module according to claim 1, wherein the jammed plug comprises:
   an axial body connected to the bottom surface of the planar plate; and
   a jammed plate, connected to the axial body, having a diameter larger than that of the axial body;
   wherein when the axial body and the jammed plate pass through the fixing hole, the bezel is buckled by jammed plate and the planar plate.

3. The backlight module according to claim 1, wherein the fixing button comprises:
   a pillar connected to the bottom surface of the planar plate; and
   a button body, connected to the pillar, having a diameter larger than that of the button hole;
   wherein when the pillar and the button body pass through the button hole, the bezel is buckled by button body and the planar plate.

4. The backlight module according to claim 1, wherein the upper surface of the planar plate is coated with a reflecting material.

5. The backlight module according to claim 1, wherein the supporting unit is formed in unity.

* * * * *